United States Patent [19]

Sekizawa et al.

[11] Patent Number: 4,675,727
[45] Date of Patent: Jun. 23, 1987

[54] OPTICAL COLOR DOCUMENT READING APPARATUS WHEREIN AN IMAGE IS BLURRED ON A COLOR IMAGE SENSOR TO MINIMIZE COLOR MOIRE PHENOMENON EFFECTS

[75] Inventors: Hidekazu Sekizawa, Yokohama; Akito Iwamoto, Kamakura, both of Japan

[73] Assignee: Kabushiki Kaisha Toshiba, Kawasaki, Japan

[21] Appl. No.: 713,823

[22] Filed: Mar. 20, 1985

[30] Foreign Application Priority Data

Mar. 29, 1984 [JP] Japan .................................. 59-59425

[51] Int. Cl.$^4$ ......................... H04N 1/46; H04N 9/07; H04N 9/09; G03F 3/08
[52] U.S. Cl. ....................................... 358/75; 358/44; 358/50; 358/55
[58] Field of Search ...................... 358/54, 75, 41, 43, 358/44, 48, 50, 55; 250/226

[56] References Cited

FOREIGN PATENT DOCUMENTS

| 3315585 | 10/1984 | Fed. Rep. of Germany | 358/75 |
| 154348 | 12/1979 | Japan | 358/75 |
| 124378 | 9/1980 | Japan | 358/55 |
| 89721 | 6/1982 | Japan | |
| 116317 | 7/1982 | Japan | |
| 182365 | 10/1983 | Japan | 358/75 |
| 61267 | 4/1984 | Japan | 358/75 |
| 108479 | 6/1984 | Japan | 358/41 |
| 1441553 | 7/1976 | United Kingdom | 358/44 |

Primary Examiner—James J. Groody
Assistant Examiner—Randall S. Svihla
Attorney, Agent, or Firm—Oblon, Fisher, Spivak, McClelland & Maier

[57] ABSTRACT

An optical document reading apparatus which minimizes color moire phenomenon effects including an optical imaging system, and a line image sensor having sensor elements arranged in a line and color filter elements disposed on the sensor elements. A plurality of sensor elements are assigned to one pixel of said document, and the line image sensor senses light reflected from the document through the optical imaging system. The apparatus has a magnification condition which is determined from a distance between the document and the optical imaging system and a distance between the optical imaging system and the image sensor. The magnification is selected to be such that the optical imaging system does not precisely image the document onto the image sensor.

10 Claims, 18 Drawing Figures

OPTICAL COLOR DOCUMENT READING APPARATUS WHEREIN AN IMAGE IS BLURRED ON A COLOR IMAGE SENSOR TO MINIMIZE COLOR MOIRE PHENOMENON EFFECTS

BACKGROUND OF THE INVENTION

The present invention relates to an optical image reading apparatus and, more particularly, to one suitable for reading color documents.

With an image reading system which uses an imaging optical system with a high resolution and a spatially dividing type photoelectric conversion device, a problem arises in that moire phenomena occur when reading dot pictures. On the other hand, in a color document reading system which uses a dot sequential type color filter assembly and a spatially dividing type photoelectric conversion device (CCD), one picture cell is formed of a plurality of photoelectric conversion elements. In the case of a proximity type sensor using spatially dividing type photoelectric conversion elements, which arranged to read a document by a magnification of 1:1, different regions within one picture cell are read by a plurality of photoelectric conversion elements. For this reason, false color noise will be generated when minute irregularities, density variation (color variation, image variation, etc.) and/or local brightness variation of illumination light, occur in a document surface which falls within the area of one picture cell. For example, where a dot picture is reproduced, false color noise in which the color and brightness periodically vary due to a moire phenomena is generated.

SUMMARY OF THE INVENTION

An object of the present invention is to provide an optical image reading apparatus which is capable of suppressing the generation of false color noise.

Another object of the present invention is to provide an optical image reading apparatus which is constructed so as to average the distribution in quantity of light within the area of one pixel (picture cell) corresponding to a unit size of the spatially dividing type image sensor.

According to the present invention, an improved optical document reading apparatus having an imaging optical system and a spatially dividing type image sensor having sensor elements, corresponding to one pixel, divided in a direction in which different color filters are arranged, and arranged to detect light reflected from a document by the image sensor through the imaging optical system, is constructed so that the image of the document is blurred on the image sensor in the sensor-element dividing direction of the spatially dividing type image sensor.

In order to blur the image of the document on the image sensor, according to one embodiment of the present invention, the positional relationship of the document and the spatially dividing type image sensor with respect to the imaging optical system is out of the positional relationship in which the document is precisely imaged onto the image sensor. In other words, by controlling the response of the optical system, the distribution in quantity of light in the area of one pixel of the image sensor is averaged with the result that the occurrence of the moire phenomena or the generation of false color noise is prevented.

According to other embodiments of the present invention, the document image on the image sensor is blurred with the aid of a pinhole array, diffraction grating, slit member, or semicylindrical lens.

DESCRIPTION OF THE PREFERRED EMBODIMENTS

Figures 1, 2A:
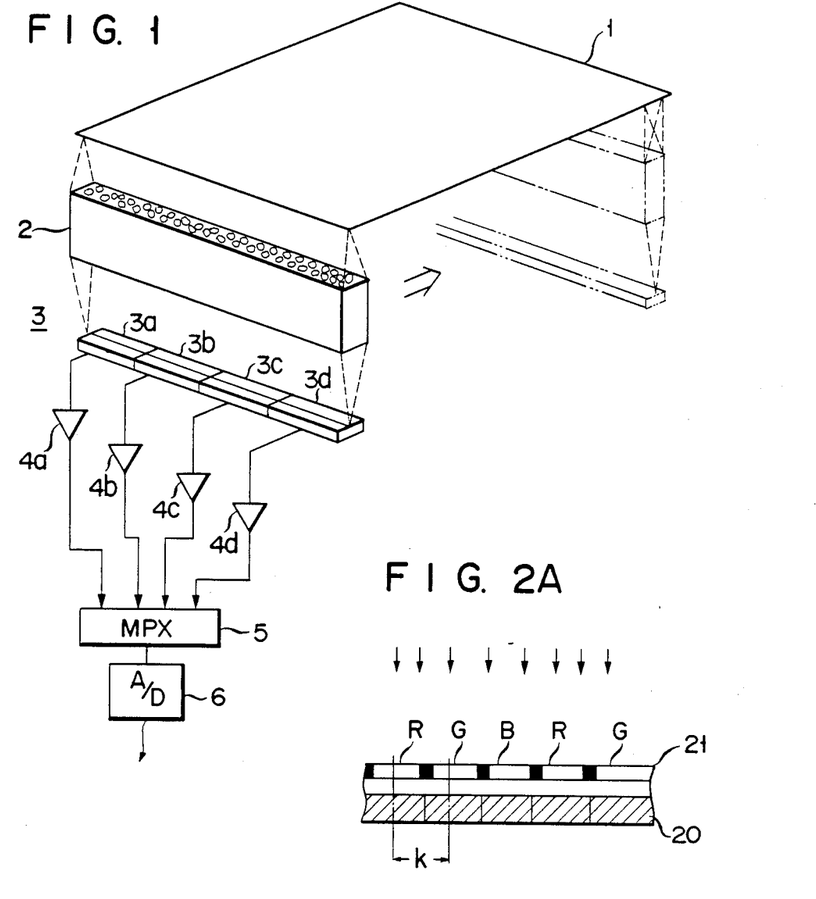
FIG. 1 shows a schematic construction of an optical image reading device according to an embodiment of the present invention.
FIGS. 2A and 2B are views for explaining the generation of false color noise in a dot-sequential type color sensor.

For a better understanding of the present invention, reference will first be made to the outline of a proximity type image sensor which is conventionally used. As shown in FIG. 1, a document 1 irradiated by a linear light source not shown is imaged onto a spatially dividing type photoelectric conversion unit (for example, CCD line sensor) 3 through a distributed index lens array (which is known under a trade name of "SEL-FOC") 2. In this line sensor, four line sensors 3a, 3b, 3c and 3d are used, the output signals from which are applied to an analog multiplexer 5 through amplifiers 4a, 4b, 4c and 4d, respectively. The output signals of the line sensors are sequentially applied, by way of the multiplexer 5, to an analog to digital (A/D) converter 6, in which they are converted into digital signals. The document 1 is scanned by the line sensor 3 in a line direction (i.e., main scanning direction), and is also scanned in the sub-scanning direction by moving the optical system and the line sensor in a direction indicated by an arrow.

In order to read a color document, a CCD line sensor equipped with dot-sequential color filters, which is used in the proximity type image sensor will now be described with reference to FIGS. 2A and 2B. In this line sensor, R, G, B color filters 21 are disposed on a dot-sequential basis immediately before a photoelectric conversion surface 20.

Figure 2B:
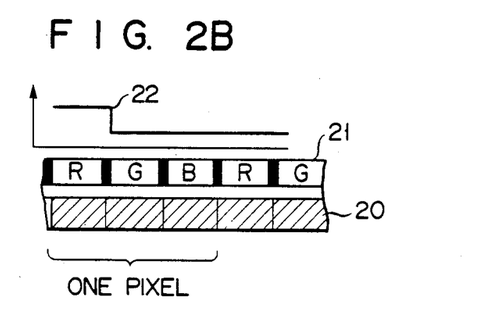

When, as shown in FIG. 2B, an achromatic input light (which corresponds to the edges of the image) having a quantity-of-light distribution corresponding to such a density distribution as indicated by a solid line 22 is applied to the line sensor, the magnitude of an output signal of a sensor element corresponding to the R color filter is greater than the magnitude of output signals of sensor elements corresponding to the G and B color filters. Therefore, the same output signal as obtained when a red-color light has been incident upon the sensor will be produced. This signal results in the generation of the false color noise. For instance, the edges of the image are reproduced with a color different from their actual color. It will be understood that this false color noise is commonly generated when a black and white document or a color document is read. In the case of a dot picture, the pattern of an input light applied to the sensor varies periodically. The dot-sequential color filters are not limited to R, G and B. Instead, G (green), Y (yellow) and C (cyan), or W (white), Y and C may be used. The order in which the color filters are arranged within the area of one pixel is not limited to any particular one. Further, this order may be different from pixel to pixel.

Figure 3:
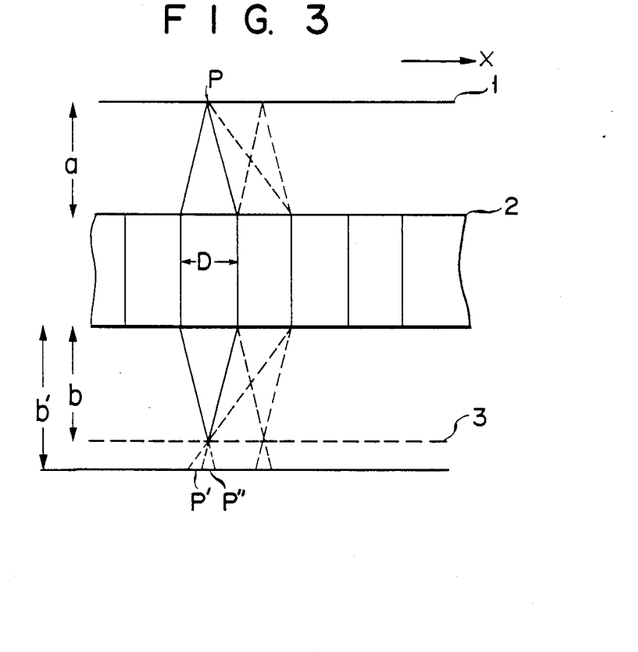
FIG. 3 shows an optical system used in the embodiment of the present invention.

An embodiment of the present invention will be described with reference to FIG. 3.

This embodiment is constructed such that the distribution of quantity of light in one pixel is averaged by bringing the optical system of the proximity type image sensor out of the geometric disposition for obtaining a magnification of unity. In order to obtain the magnification of unity, the optical system of the proximity type image sensor is disposed so that the distance a between the document 1 and the SELFOC lens array (hereinafter, referred to as SLA) 2 equals the distance b between the line sensor 3 and the SLA 2. The magnification m of an imaging optical system is expressed by b/a and, in the case of the proximity type image sensor, is set such that m=1. As shown, in this embodiment, the line sensor 3 is disposed at a position spaced from the SLA 2 by a distance b' greater than the usual distance b. As a result, the image of a point P on the document 1 is obtained on the line sensor 3 in the form of a duplex image as indicated at the points P' and P''. Thus, as understood, the distribution in quantity of light in the area of one picture cell is made uniform. For this reason, the generation of false color noise as described in connection with FIGS. 2A and 2B is prevented.

The requirement for uniformly distributing quantity of light in the area of one picture cell will now be described. Assume now that the quantity-of-light distribution on the document is expressed by f(X) and the quantity-of-light distribution on the focusing surface when rod lens elements each having a diameter of D are arranged closely as shown in FIG. 3 is expressed by g(X). The imaging magnification is assumed to be m. Then, the quantity-of-light distribution on the line sensor resulting from the nth rod lens element is expressed in the form of $f(mX_n - n \cdot D)$. Since $X_n$ is $X + nD$, g(X) is given by $$g(X) = \sum_{n=0}^{N-1} f\{mX - n \cdot D(m-1)\} \tag{1}$$

Even if a following equation is used as the quantity-of-input light distribution, the generality can be secured. Namely, $$f(X) = \cos 2\pi\xi X + 1 \tag{2}$$

where $\xi$ represents a spatial frequency. Therefore, g(X) can be expressed as follows:

$$g(X) = N + \frac{\cos\left(\theta + \frac{N-1}{2}\beta\right) \sin\frac{N}{2}\beta}{\sin\beta/2} \tag{3}$$

$(\sin \beta/2 \neq 0)$ where $\theta = 2\pi m\xi X$, and $\beta = 2\pi\xi D(m-1)$.

When N=2 which represents the duplex image, is substituted into equation (3), g(X) can be rewritten as follows:

$$g(X) = 2 + 2\cos(\theta + \beta/2)\cos\beta/2 \tag{4}$$

Figure 4:
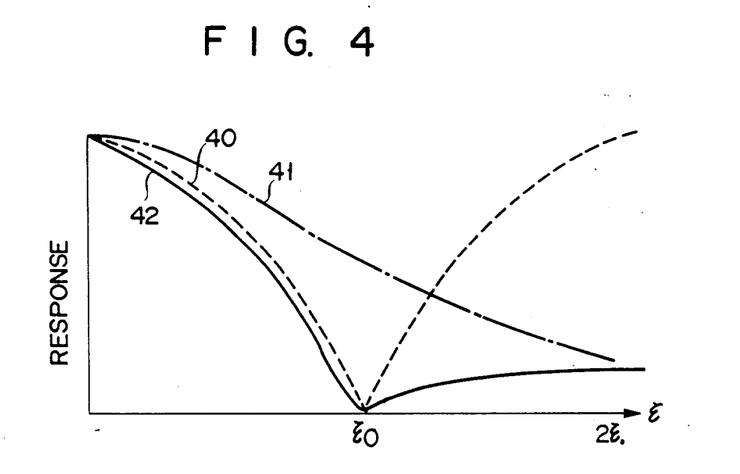
FIG. 4 is a graphic diagram for explaining the characteristics of the optical system shown in FIG. 3.

When $\beta/2 = \pi/2$, g(X) has a fixed value. The spatial frequency at this condition is assumed to be $\mu_0$. The response of g(X) expressed by equation (4) is shown in FIG. 4 by a broken line 40. The characteristics of SLA is shown in FIG. 4 by a dot-dash-line 41. Accordingly, the synthetic response of SLA is indicated in FIG. 4 by a solid line 42.

Next, a color difference signal ΔE (which indicates the difference between output signals obtained from two adjacent photoelectric conversion elements corresponding to different color filters) in the color image sensor shown in FIG. 2 will be described. Where the pitch of the dot-sequential color filters is k as shown in FIG. 2A and where an achromatic input light pattern having its quantity of light distribution expressed in the form of equation (2) is imaged onto the image sensor with the color filters, the color difference signal ΔE is given by $$\Delta E = f(X) - f(X + k) \tag{5}$$
$$= 2\sin(\pi\xi k) \cdot \sin 2\pi\xi(X + k/2)$$

To obtain formula (5), it is assumed that an output signal obtained from each photoelectric conversion element is normalized by a white signal.

Figure 5:
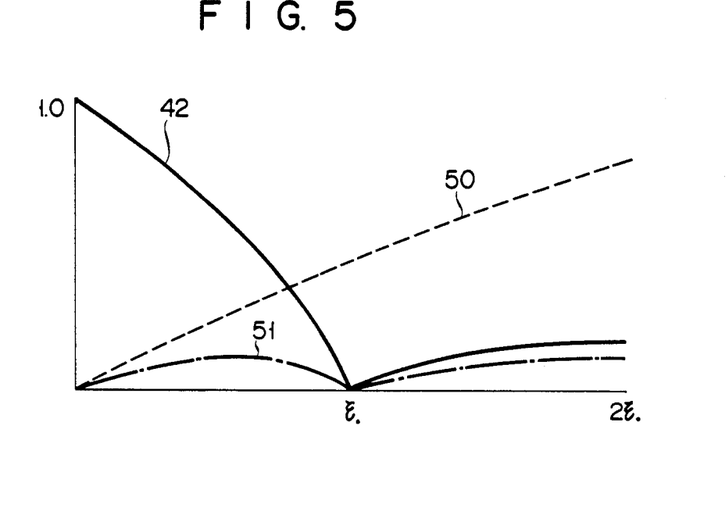
FIG. 5 is a graphic diagram for explaining the reduction of false color noise in the optical system shown in FIG. 3.

Ideally, ΔE must be zero irrespective of $\xi$. In the case of the spatially dividing color image sensor of a dot-sequential type, however, it is difficult to make ΔE zero. For example, the characteristic of ΔE obtained when $3k = \frac{1}{2}\xi_0$ is shown in FIG. 5. In FIG. 5, a broken line 50 indicates ΔE expressed by formula (5), while a solid line 42 indicates the synthetic response of SLA. This is the response expressed by formula (4) when the duplex image is obtained. Accordingly a substantial ΔE has such a characteristic as indicated in FIG. 5 by a dot-dash-line 51. It will be understood that the generation of false color noise is suppressed to a considerable extent.

Reference will now be made to the amount of deviation ΔL (=b'−a) in geometric disposition of the optical system. The requirement for making g(X) expressed by formula (4) constant is $\beta/2 = \pi/2$ as stated before. From formula (4), $1/\xi_0 = 2D(m-1)$. Further, from FIG. 3, the following formula is obtained.

$$m - 1 = (b'/a) - 1 \approx (4/Tc)\Delta L$$

where Tc(=4a) represents a conjugate length of the distributed index lens array, i.e., the distance between document 1 and the plane of image sensor 3. Further, since $3k = S = \frac{1}{2}\xi_0$, $$\Delta L = (Tc/4) \cdot (S/D)$$

Figure 6:
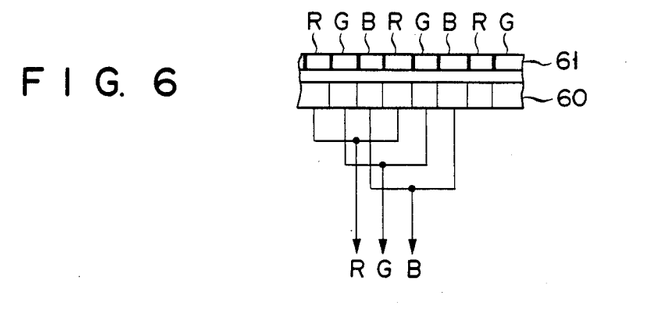
FIG. 6 shows an image sensor so constructed that it has a twofold high resolution.
Figure 7:
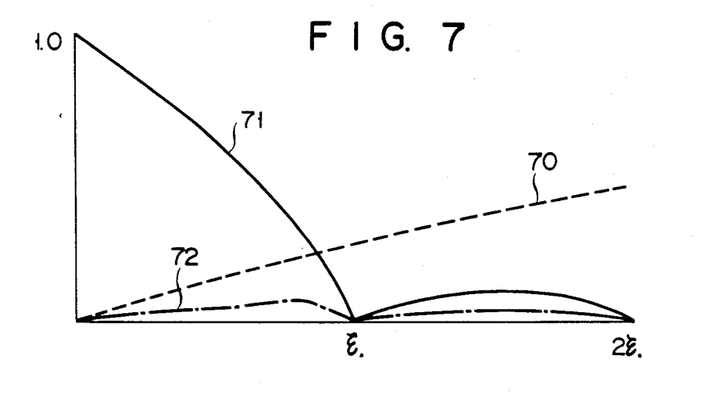
FIG. 7 is a graphic diagram for explaining the optical characteristics obtained with the use of the construction shown in FIG. 6.

As shown in FIG. 6, the image sensor may be arranged to have a twofold resolution and add together output signals of the same color. In this case, k (the pitch of the color filters and photoelectric conversion elements) is half of the pitch in the image sensor shown in FIG. 2. Therefore, the color difference signal $\Delta E$ becomes, as indicated in FIG. 7 by a broken line 70, smaller than in FIG. 5. Since the color signals are averaged with respect to two picture cells, the synthetic response of SLA becomes zero at $2\xi_0$, with the result that it becomes smaller than in FIG. 5, as indicated in FIG. 7 by a solid line 71. A substantial $\Delta E$ also becomes smaller than in FIG. 5, as indicated in FIG. 7 by a dot-dash-line 72. With this construction, it is possible to lessen the false color noise.

N=2 which is used in obtaining formula (4) from formula (3) means that the overlapping number of images in SLA is 2. In the case where N=4 as well, g(X) becomes 0 at $\xi_0$, as shown in FIG. 5. However, where N=3, the response does not become zero. The number N of overlapped images is defined by a value obtained by dividing the radius of field of a rod lens element of SLA by the diameter of this rod lens element.

The preceding embodiment has an advantage of reducing the false color noise without decreasing the quantity of light and without decreasing low frequency picture information effective in picture reproduction.

Other embodiments of the present invention which are constructed so as to reduce the false color noise by using a pinhole array will now be described.

Figure 8:
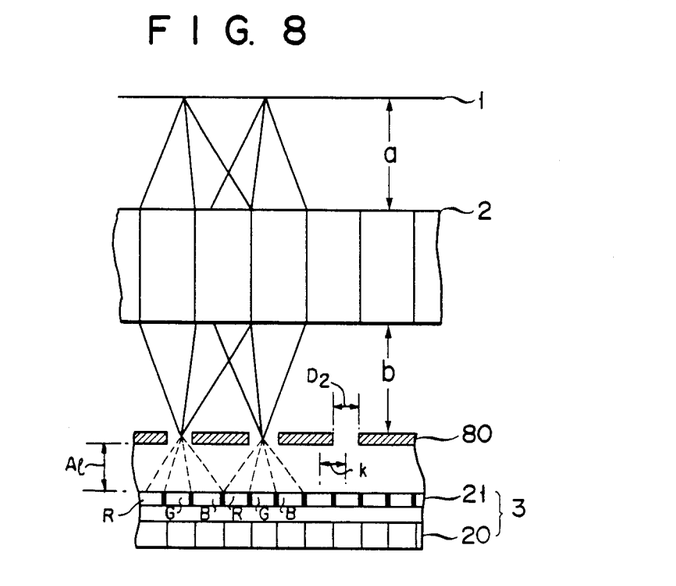
FIGS. 8 to 10 show other embodiments of the present invention.

In the embodiment of FIG. 8, a pinhole array 80 is disposed between the SLA 2 and the color image sensor 3 such that the document 1 is imaged on the pinhole array 80 by way of the SLA 2. The document image thus obtained is sampled by the pinhole array 80 and light passed through this pinhole array 80 is sensed by the color image sensor 3. The distance $\Delta l$ between the pinhole array 80 and the color image sensor 3 is so set that the light may be uniformly distributed within the area of one picture cell of the image sensor 3 so as to prevent the generation of false color noise. The distance $\Delta l$ is related by diameter D2 of the pinhole and the pitch k of the dot-sequential color filters as follows:

$$\Delta l / 3k \simeq D2$$

Figure 9:
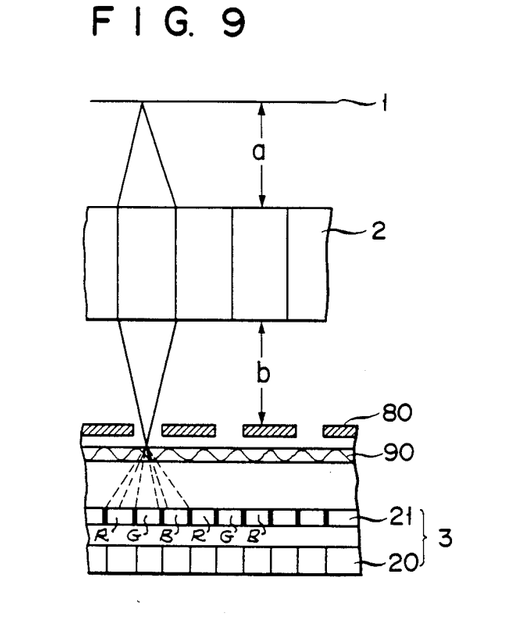

In the embodiment of FIG. 9, in order to make the quantity of light in the area of one picture cell more uniform than in the embodiment of FIG. 8, a diffraction grating 90 is disposed between the pinhole array 80 and the color image sensor 3. With this construction, it is possible to effectively reduce the false color noise without decreasing high frequency components of input picture information very much.

Figure 10:
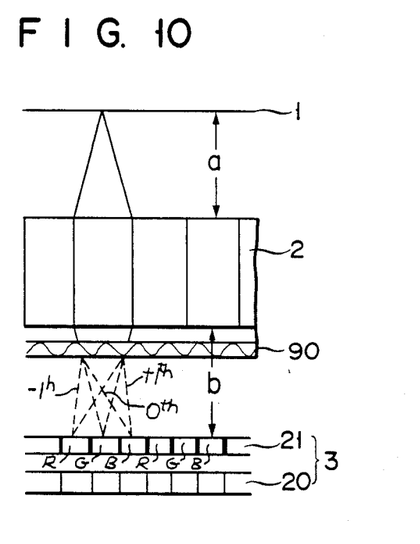

In the embodiment of FIG. 10 only the diffraction grating 90 is disposed between the SLA 2 and the color image sensor 3. In this construction, although the unity magnification condition that the distance a between the document 1 and the SLA 2 is equal to the distance b between the SLA 2 and the sensor 3 is satisfied, the 0th-order diffracted light, $-$1th-order diffracted light and $+$1th-order diffracted light from the diffraction grating 90 are incident upon the G, R and B color filters in the area of one picture cell of the image sensor 3, respectively. As a result, since the quantity of light is averaged in the area of one picture cell, the generation of false color noise is suppressed.

The above-mentioned embodiments are each so constructed as to blur an image of the document on the color image sensor in the main scanning direction of the document. However, it is also possible to blur the image of the document in the sub-scanning direction of the document with the aid of a semicylindrical lens or diffraction grating, thereby to suppress the generation of false color noise. Reference will now be made to an embodiment having such a construction. In this embodiment, since an information signal corresponding to one point of the document is simultaneously separated into color information signals, the above-mentioned problem such as generation of false color noise which could be raised in connection with the above-mentioned dot-sequential type color image sensor will not arise. The feature that color information signals are simultaneously obtained indicates that any particular line memory is not required for the color signal processing.

Figure 11:
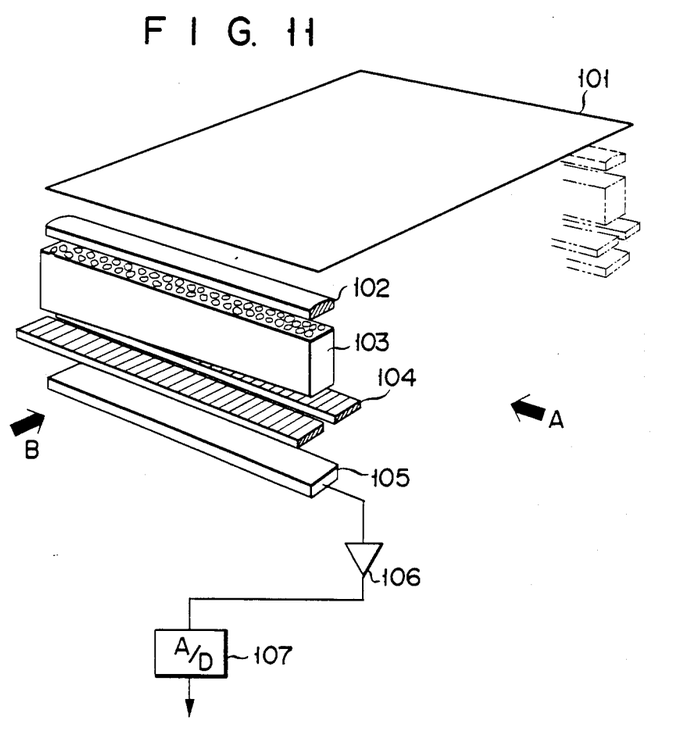
FIG. 11 and FIGS. 12A and 12B show still another embodiment of the present invention.

Referring now to FIG. 11, the document 101 is imaged onto the color sensor 105 through the semi-cylindrical lens 102, SLA 103 and slit member 104. In this embodiment, a large-sized color sensor such as amorphous silicon, CCD, etc., is used, which is unlike the color sensor used in the preceding embodiments. The color information signals which have sequentially been read from this color sensor are amplified by an amplifier 106 and then are converted into digital signals by an analog to digital converter 107.

Figure 12A:
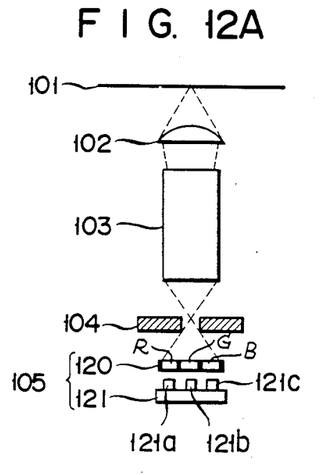
Figure 12B:
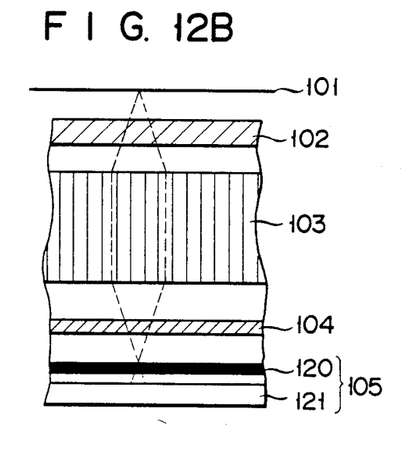

FIG. 12A is a view which has been taken in the direction indicated by an arrow A of FIG. 11, i.e., in the main scanning direction of the document, while, on the other hand, FIG. 12B is a view which has been taken in the direction indicated by an arrow B of FIG. 11, i.e., in the sub-scanning direction of the document. As shown in FIG. 12A, light reflected from the document 101 is focused onto the slit member 104 in the sub-scanning direction by way of the semicylindrical lens 102 and SLA 103. The light passed through the slit member 104 is picked up by the color sensor 105 having color filters 120 and a line sensor 121. In the color filters 120, R, G and B color filters are arranged in the sub-scanning direction. Similarly, the line sensor 121 has three line sensor elements, 121a, 121b, 121c corresponding to the R, G, and B color filters. As shown in FIG. 12B, the light reflected from the document 101 is focused with high resolution onto the sensor 105 in the main scanning direction without being affected by the semicylindrical lens 102 and the slit member 104.

Figure 13:
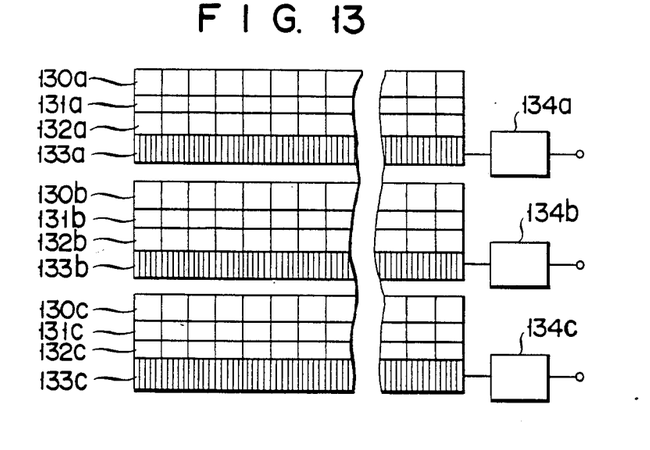
FIGS. 13 to 15 show the construction of the image sensor used in the embodiment shown in FIG. 11.
Figure 14:
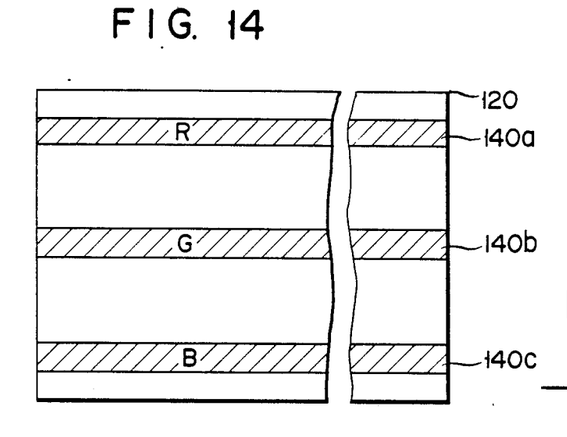
Figure 15:
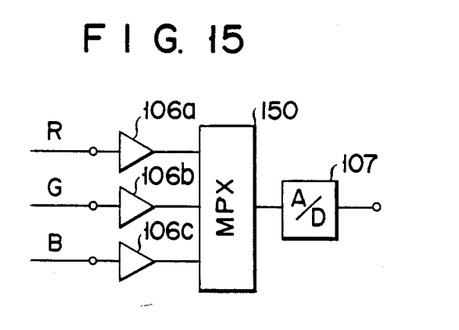

A construction of the line sensor used in this embodiment will now be described. In FIG. 13, photodiode 130a (130b, 130c) receives an incident light through a corresponding color filter and converts it into an electrical signal. This electric signal is stored beneath a storage electrode 131a (131b, 131c) and subsequently is transferred, by means of a shift electrode 132a (132b, 132c), into a transfer section 133a (133b, 133c) composed of a CCD analog shift register. In each transfer section, the electrical signal is serially transferred to a corresponding sense amplifier 134a (134b, 134c). As shown in FIG. 14, stripe color filters 140a, 140b and 140c of R, G and B can be used for the color filter. For this reason, the position of the color filter need not be brought into match with that of the sensor. For this reason, the manufacture of the color sensor is easy. The three line sensor elements can be formed on one chip, but may be provided as separate members. As shown in FIG. 15, the electrical signals of R, G, and B from the sense amplifiers 134a, 134b and 134c are amplified in amplifiers 106a, 106b and 106c. Thereafter, these signals are sequentially applied through a multiplexer 150 to the A/D converter 107, in which they are converted into digital signals. This construction of the color sensor is only one example and it may be modified in various forms.

Figure 16:
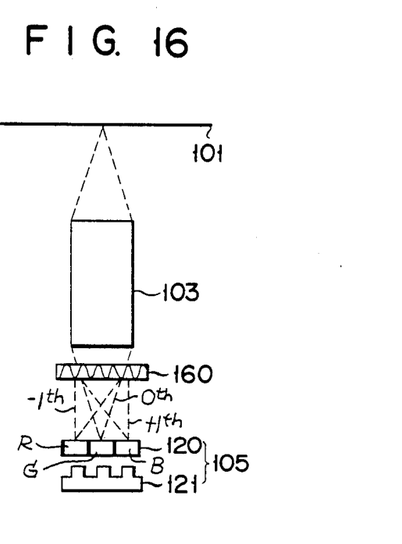
FIG. 16 shows a modification of the embodiment shown in FIG. 11.

A modification of the embodiment of FIG. 11 is shown in FIG. 16. In this modification, a diffraction grating 160 is disposed between SLA 103 and color sensor 105, as in FIG. 10, whereby light reflected from the document 101 is divided in the sub-scanning direction into 0th and ±1th-order diffracted lights. These light components are sensed by the three-line color sensor 105, as in the embodiment of FIG. 11.

What is claimed is:

1. An optical document reading apparatus comprising:
    an optical imaging system;
    a line image sensor having sensor elements arranged in a line and color filter elements disposed on said sensor elements, a plurality of said sensor elements corresponding to one pixel of a document, said line image sensor being adapted for sensing light reflected from said document through said optical imaging system;
    wherein the magnification of said optical imaging system, which is determined from a distance between said document and said optical imaging system and a distance between said optical imaging system and said image sensor, is selected to be such that the optical imaging system does not precisely image the document onto said image sensor.

2. The apparatus according to claim 1, wherein the magnification at which said optical imaging system precisely images said document onto said image sensor is unity.

3. The apparatus according to claim 1, wherein said optical imaging system comprises a distributed index lens array, and a distance between said distributed index lens array and said image sensor is different from a distance between said document and said distributed index lens array.

4. The apparatus according to claim 3, wherein the distance between said distributed index lens array and said image sensor is greater than the distance between said document and said distributed index lens array.

5. The apparatus according to claim 3, wherein a value which is determined by dividing the radius of field of one of a plurality of rod lens elements constituting said distributed index lens array by the diameter of said one rod lens element is substantially an integer multiple of 2.

6. The apparatus according to claim 3, wherein the difference between the distance between said distributed index lens array and said document and the distance between said distributed index lens array and said image sensor is approximately equal to $(T_c/4)\cdot(S/D)$ where $T_c$ represents the conjugate length of said distributed index lens array, D represents the diameter of one of a plurality of rod lens elements constituting said distributed index lens array, and S represents the total length in the direction of said line of said plurality of sensor elements corresponding to one pixel of said document.

7. The apparatus according to claim 1, wherein a pinhole array is disposed between said optical imaging system and said image sensor at a position at which said optical imaging system precisely images said document onto said pinhole array.

8. The apparatus according to claim 1, wherein a pinhole array is disposed between said optical imaging system and said image sensor and a diffraction grating is disposed between said pinhole array and said image sensor.

9. An optical document reading apparatus comprising:
    an optical imaging system;
    a line image sensor means having three line image sensors arranged in parallel, of said line image sensors each having sensor elements arranged in a line extending in a given direction, three different color filter elements being disposed on said three line image sensors, respectively, three of said sensor elements corresponding to one pixel of a document, said three sensor elments comprising one sensor element of each of said line image sensors and being arranged in a line extending perpendicular to said given direction, said line sensor means being adapted for sensing light reflected from said document through said optical imaging system;
    a semicylindrical lens disposed, between said document and said optical imaging system and extending in said given direction; and
    a slit member disposed between said optical imaging system and said line sensor means and having a slit extending in said given direction.

10. The apparatus according to claim 9, wherein said slit member is disposed at a position at which said optical imaging system precisely images said document onto said slit member.

* * * * *